Oct. 26, 1948. K. E. BEMIS 2,452,218
HAMBURGER APPORTIONING, FORMING, AND WRAPPING MACHINE
Filed July 15, 1946 2 Sheets-Sheet 1

Inventor
Ken E. Bemis
By Philip A. Friedell
Attorney

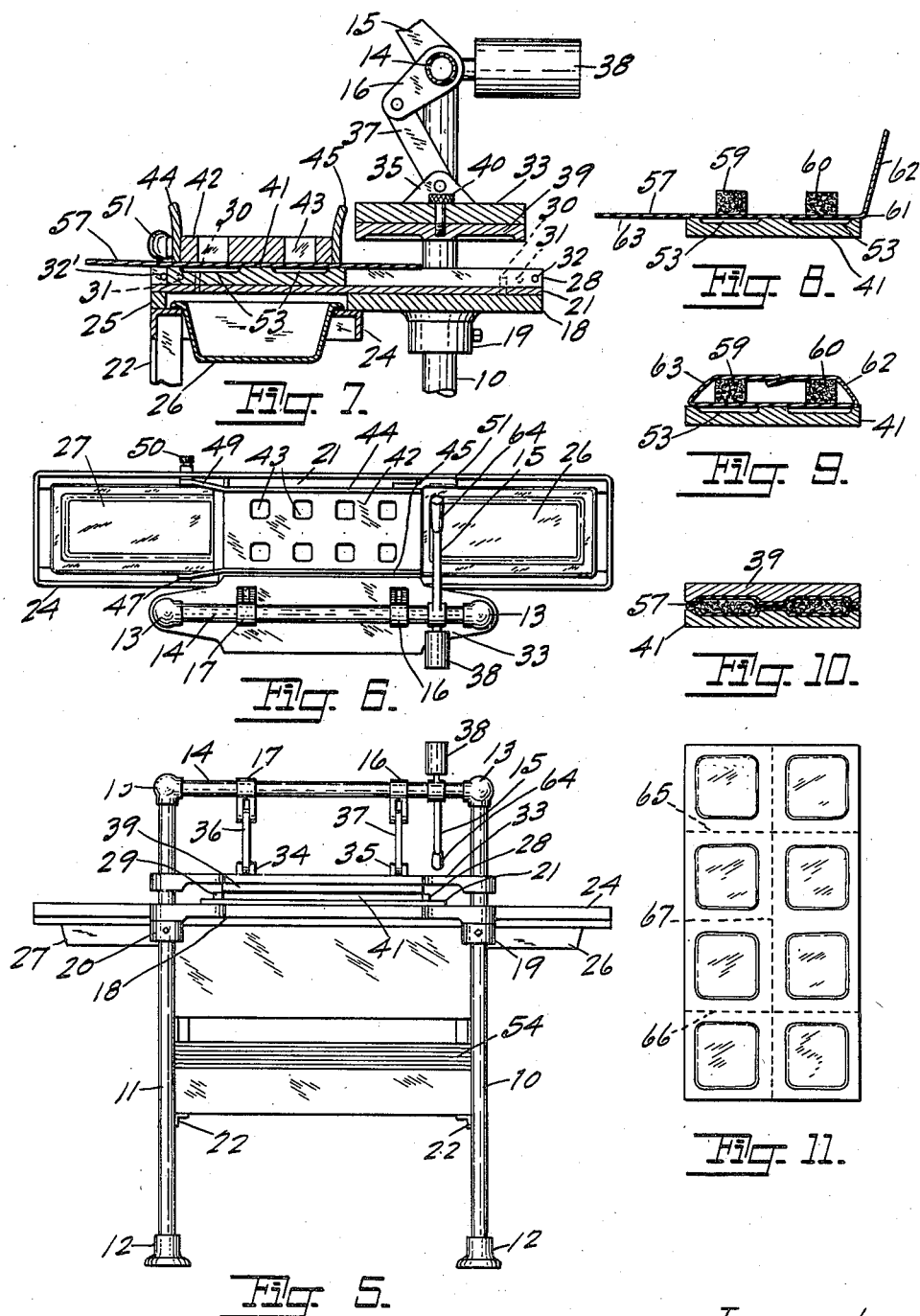

Patented Oct. 26, 1948

2,452,218

UNITED STATES PATENT OFFICE 2,452,218

HAMBURGER APPORTIONING, FORMING, AND WRAPPING MACHINE

Ken E. Bemis, Oakland, Calif.

Application July 15, 1946, Serial No. 683,588

13 Claims. (Cl. 17—32)

This invention relates to improvements in machines for apportioning, forming, and wrapping materials, particularly food products and is specifically designed for making and wrapping hamburger and sausage patties and the like.

This invention is a modification of the Means for wrapping and sealing disclosed in my Patent No. 2,395,531, issued February 26, 1946, and which is power driven and which seals the packages by the application of heat, and which is suitable only for large scale production, while my new machine is hand operated and does not employ heat for sealing the packages and therefore is suited to small scale production and suitable for any restaurant or meat market, having capacity sufficient for even the largest establishments of this type, and irrespective of availability of power or heating means.

Restaurants, hamburger stands, lunch counters and the like serve a great many hamburger sandwiches and steaks in a day and a great deal of time is consumed in preparing the patties by hand, and furthermore, the meat is formed directly by the hands of the operator and cannot be considered as conforming to the most desirable conditions of sanitation or to delectability. Meat markets are often requested to form these hamburger and sausage patties and likewise they are formed by hand and stacked one on top of the other with simply a loose sheet of parchment or waxed paper between the patties and with the edges all open to the air.

My invention apportions, forms and wraps these patties at a speed many times greater than can be carried out by hand patting and wrapping, insures uniformity in volume, and complete sealing from the atmosphere, and without ever being touched by the hands of the operator. An amount of meat can be ground sufficient to make a predetermined number of patties of predetermined weight, and that ground meat can then be operated upon by my new machine to produce that number of patties all substantially equal in weight, thickness and area, and fully wrapped and sealed completely out of contact with the atmosphere, and free of human contact.

After the desired number of patties have been formed, the machine can be cleaned and made ready for instant use when more patties are required.

The machine is also arranged for making several sizes of patties, for sandwiches and for steaks by simple interchange of dies and apportioner. Wrapping and sealing is partly a hand and partly a machine operation, completion of the wrapping and sealing being accomplished by the folding of a single wrapper containing a number of equally spaced patties, and the folding effects such sealing as was not provided in the pressing operation.

The objects and advantages of the invention are as follows:

First, to provide a manually operable machine for apportioning, compressing, wrapping and sealing certain types of food products.

Second, to provide a machine with which ground meats can be apportioned, formed into patties, and wrapped and sealed, without human contact with the meat or patties.

Third, to provide a machine which will compress and spread portions of ground meat to predetermined thickness and area.

Fourth, to provide a machine with which portions of ground meat of different volume and weight can be selectively formed into patties to provide steaks or sandwich patties, as desired.

Fifth, to provide a machine as outlined with which patties can be simultaneously wrapped and sealed.

Sixth, to provide a machine of the type outlined which is capable through manual operation of forming patties rapidly and uniformly and which is easy to operate and to clean.

Seventh, to provide a machine as outlined which is simple in construction and operation and economical to manufacture.

In describing the invention reference will be made to the accompanying drawings, in which:

Fig. 5 is a rear elevation of the machine.

Fig. 6 is a top plan view of Fig. 5.

Fig. 7 is an enlarged fragmentary sectional elevation taken centrally through the machine.

Fig. 8 illustrates the first step in the method of forming and wrapping patties, with apportioned ground meat deposited on the wrapping paper which in turn is supported on the lower die.

Fig. 9 shows the second step in which the longitudinal edges of the wrapper are folded over the portions.

Fig. 10 shows the portions compressed into patties between the dies and with the wrapper formed thereabout.

Fig. 11 illustrates the method of folding a strip of sandwich patties for completing the seal.

Figure 1:
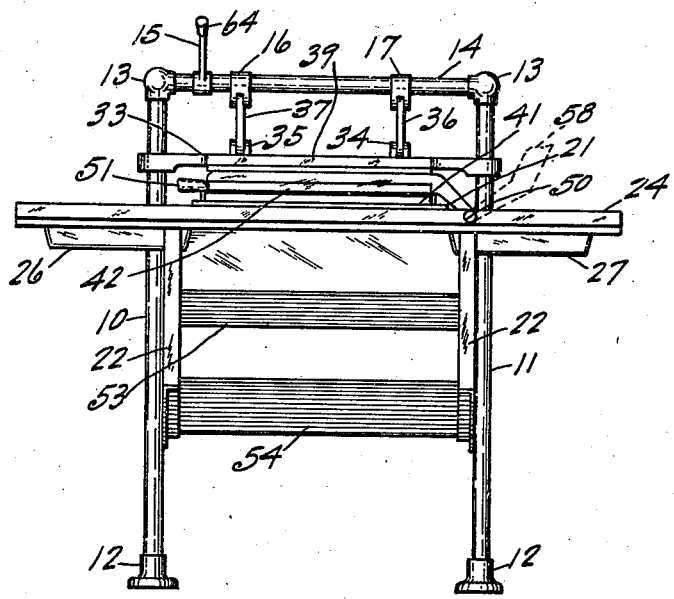
Fig. 1 is a front elevation of the invention.

As illustrated, the legs 10 and 11 are formed of sections of tubing or pipe, each having a foot 12 at the lower end extending forwardly to provide a firm support, and provided with a ball-type elbow 13 at the upper end, the transverse legs of which are bored to form bearings for the toggle shaft 14 which likewise is formed of tubing or a section of pipe.

Fixedly mounted on the toggle shaft is an operating lever 15 and a pair of toggle levers 16 and 17.

A bed plate 18 spans the legs 10 and 11 and has bores which slidably receive the legs and this bed plate is supported on adjustable set collars 19 and 20 by which suitable adjustment of the bed plate is obtained.

A work table consisting of a flat plate 21 is fixed on the bed plate and extends forwardly with the forward end supported by a pair of brackets 22 which are secured to the respective legs as indicated at 23 and tied at the upper end to the bed plate by a frame 24 which extends beyond both sides of the work table, with the work table spaced from the frame at the back by the bed plate, and at the front by a filler 25, the frame 24 being formed of small angles with the top legs projecting inwardly from the filler and bed plate to provide a support and slideway for the pans 26 and 27, while the spacing from the work table provided by the filler and bed plate permits sliding the pans from one end to the other.

Removably and reversibly mounted on the work table is a pair of guides 28 and 29 and which have a pin 30 adjacent each end to fit in suitable holes formed in the work table, and each has oppositely projecting pins 31 and 32 at its respective ends.

Slidably mounted on the standards 10 and 11 is a head 33 which has spaced ears or yokes 34 and 35 in vertical alignment with the toggle levers 16 and 17 and connected thereto by the links 36 and 37. A counterweight 38 is made sufficiently heavy to retain the head 33 in a raised position, and a die 39 is removably secured to the head as indicated at 40.

The lower die 41 is slidable on the work table and guided by the guides 28 and 29 and limited as to movement in either direction by the stop pins 32 or 31.

The apportioning die 42 has a plurality of equally spaced passages 43 which are formed to a specific volume to hold a predetermined weight of ground meat or other product to be formed into patties and wrapped, and side walls 44 and 45 guide the material and retain it within the necessary confines for filling the passages, and this die is suitably hinged to the elongated frame 24, one arm having a pivot 46 to fit into a hole in one bracket 47 while a hole 48 is provided in the other arm 49 to receive a screw-type pivot 50 and a handle 51 is provided for the other end of the apportioning die.

The forming dies 39 and 41 are identical, each having recesses which have the same spacing as the apportioning passages in the apportioning die.

Suitable sloping shelves 53 and 54 having different depths are provided for different sizes of wrappers required for the respective sizes of patties to be made.

Figures 2, 3, 4:
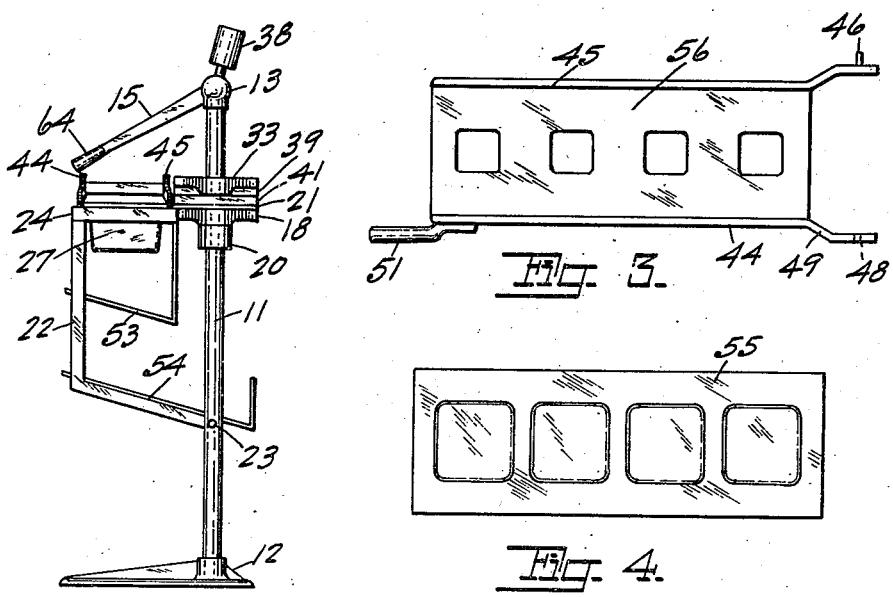
Fig. 2 is a side elevation of Fig. 1.
Fig. 3 is a top plan view of the apportioning die for hamburger or sausage steaks.
Fig. 4 is a plan view of one of the forming dies for the steaks apportioned by the die in Fig. 3.

The apportioning and forming dies shown in Figs. 1, 2, 5, 6 and 7 are for apportioning, forming and wrapping eight sandwich patties at a time, while those shown in Figs. 3 and 4 are for forming four hamburger steaks at a time.

The operation of the invention is as follows:

For hamburger sandwich patties, the head die 39 is secured to the head as indicated, and the base die 41 is placed between the guides 28 and 29 with these guides arranged so that the stop pins 32 project inwardly as shown, and the apportioning die 42 is mounted in position.

For hamburger steaks, these dies are replaced by the head and base dies 55 and apportioning die 56, Figs. 4 and 3, and the guides 28 and 29 are turned end for end so that the pins 31 project inwardly.

Considering the preparing of sandwich patties with the dies installed as shown in the several views, the operator dons non-contaminable gloves, formed of rubber, resilient plastic, or other suitable material and which have been sterilized.

The pan 26 is filled with the ground meat and the other pan 27 left empty. The base die is moved forward until stopped by the pins 32'. A sheet of wrapping paper 57 is placed on top of the die as shown in Fig. 7, and the apportioning die is lowered from its raised position 58 to that shown in Figs. 1, 6 and 7, resting on top of the wrapper.

The operator takes ground meat from the pan 26, places it on the apportioning die at the right hand end of the die, viewing Fig. 1, then pushes the material through between the guides 44 and 45 simultaneously pressing down to fill all of the passages 43 then with his gloved hand pushes or drags all of the excess into the pans. The die is then raised slightly and the portions are pushed down out of the passages by the gloved fingers of the operator, and when all are cleared, the apportioning die is swung back out of the way, leaving the series 59 and 60 of portions deposited on the paper 57 centrally over the recesses 53 in the base forming die 41 as shown in Fig. 8.

The wrappers are pre-cut to size and are pre-creased as indicated at 61 for uniform folding so that after the apportioning die has been swung out of the way, the two sides 62 and 63 of the paper are folded over the tops of the portions as indicated in Fig. 9.

The die with the wrapper and portions is then slid back until stopped by the pins 32 which brings the head and base dies in registrable relation.

The handle 64 is then pulled down to the position shown in Fig. 5 and pressed creating a terrific pressure on the portions to press them into patties, the knuckle joints 16—37 and 17—36 creating this terrific pressure with relatively slight pressure on the handle. This compresses the portions and spreads them into patties and simultaneously presses the wrapper all around each patty since there is just clearance between the portions of the dies surrounding the recesses for the thicknesses of paper, the formed patties with wrapper appearing as indicated in Fig. 10. The handle is released and the counterweight 38 raises the head with its die to the position shown in Fig. 7.

The base die with its wrapped patties is now slid forward until stopped by the stops 32', the group of wrapped patties is first folded up and over at 65 and 66, making a two-high stack of four patties each. This two-high stack is next folded over at 67, making a four-high stack of two patties each with all relatively free edges of the wrapper folded inside the stack and thereby providing a complete seal. These are next placed into suitable cartons and placed in a refrigerator or frozen as may be preferred.

The entire operation of apportioning, folding the wrapper, compressing into patties, and folding the wrapped patties into completely sealed stacks takes less than thirty seconds with the production of eight patties completely sealed and ready for delivery.

For hamburger steaks, the operations are identical except that because the steaks are larger, only four are formed at a time and the folding is carried out only at the points 65 and 66, the guides 28 being turned end for end so that the closer spaced stop pins 31 limit the movement of the base die for registry with the narrower apportioner and head die, to provide registry.

When all of the meat has been used in the pan 26, it is lifted out of the frame and the pan 27 is given a push causing it to slide back to the position previously occupied by pan 26. Lifting either one out permits the sliding of the other one to the other location, and also eliminates the necessity of transferring the excess meat back to the first pan.

The shelf 53 is arranged to hold wrappers for the steaks while shelf 54 is of suitable width to hold the wrappers for the sandwich patties. Special means is provided for creasing the wrappers before they are placed in the shelves but as this means does not form a part of this invention it is not shown.

The number of patties formed with each operation is not limited to four or eight as illustrated, though these numbers provide the most desirable capacity for average restaurants and meat markets. With this machine a relatively inexperienced operator can easily turn out a thousand wrapped and sealed sandwich patties in an hour.

I claim:

1. A patty forming and wrapping machine, in combination, apportioning means, head and base dies and urging means for urging the head die relative to the base die for compressing portions therebetween, said base die being slidably supported, and guiding means for said base die and including stop means for limiting sliding movement thereof for registry respectively with said head die and with said apportioning means, said apportioning means being movable into and out of cooperation with said base die when said base die is moved into position for registry therewith, and a receptacle removably supported in receiving position with each of the respective ends of the apportioning die to hold material to be formed into patties and receive material in excess of that required to form a set of portions.

2. A patty forming and wrapping machine, in combination, apportioning means, head and base dies and urging means for urging the head die relative to the base die for compressing portions therebetween, said base die being slidably supported, and guiding means for said base die and including stop means for limiting sliding movement thereof for registry respectively with said head die and with said apportioning means, said apportioning means being movable into and out of cooperation with said base die when said base die is moved into position for registry therewith; said base die formed with forming recesses, and said apportioning die comprising a member hinged at one end and having a plurality of equally-spaced passages formed therethrough to register with said forming recesses, and having side retainers for material, and swingable to two positions, in one of which the apportioning die rests on the base die, and in the other of which it is out of obstructive relation for sliding of the base die into registry with the head die.

3. A patty forming and wrapping machine, in combination, apportioning means, head and base dies and urging means for urging the head die relative to the base die for compressing portions therebetween, said base die being slidably supported, and guiding means for said base die and including stop means for limiting sliding movement thereof for registry respectively with said head die and with said apportioning means, said apportioning means being movable into and out of cooperation with said base die when said base die is moved into position for registry therewith; said base die formed with forming recesses, and a receptacle removably supported in receiving position with each of the respective ends of the apportioning die to hold material to be formed into patties and receive material in excess of that required to form a set of portions; said apportioning die comprising a member hinged at one end and having a plurality of equally-spaced passages formed therethrough to register with said forming recesses, and having side retainers for material, and swingable to two positions, in one of which the apportioning die rests on the base die, and in the other of which it is out of obstructive relation for sliding of the base die into registry with the head die.

4. A patty forming and wrapping machine, in combination, apportioning means, head and base dies and urging means for urging the head die relative to the base die for compressing portions therebetween, said base die being slidably supported, and guiding means for said base die and including stop means for limiting sliding movement thereof for registry respectively with said head die and with said apportioning means, said apportioning means being movable into and out of cooperation with said base die when said base die is moved into position for registry therewith; and a work table providing a sliding surface for said base die and having said guiding means removably mounted thereon; said guiding means including two sets of stops differently spaced and reversible to function as stopping means for different sizes of dies selectively.

5. A patty forming and wrapping machine, in combination, apportioning means, head and base dies and urging means for urging the head die relative to the base die for compressing portions therebetween, said base die being slidably supported, and guiding means for said base die and including stop means for limiting sliding movement thereof for registry respectively with said head die and with said apportioning means, said apportioning means being movable into and out of cooperation with said base die when said base die is moved into position for registry therewith; a work table providing a sliding surface for said base die and having said guiding means removably mounted thereon; said guiding means including two sets of stops differently spaced and reversible to function as stopping means for different sizes of dies selectively, and a pan frame mounted beneath said work table and extending from each side thereof to support at the respective ends a material supply pan and an excess material receiving pan, and having clearance beneath the table for sliding one of the pans to the other end of the frame when the other pan is removed.

6. A patty forming and wrapping machine comprising; a frame; a bed immovably supported by said frame, and a work table supported thereby and extending forwardly and providing a sliding surface; guide means on said work table and a base die slidably supported thereon, and stop means for limiting the travel of said base die in each direction; a head, and means for urging said head toward said work table at will, and a head die mountable on said head; and an apportioning die movable to register with said base die when said base die is in one position in cooperation with certain of said stops, and including apportioning recesses to receive portions of material for deposit on said base die, and movable at will out of obstructive relation for movement of the base die to its other limit of travel for registry with said head die; and a receptacle removably supported in receiving position with each of the respective ends of the apportioning die to hold material to be formed into patties and receive material in excess of that required to form a set of portions.

7. A patty forming and wrapping machine comprising; a frame; a bed immovably supported by said frame, and a work table supported thereby and extending forwardly and providing a sliding surface; guide means on said work table and a base die slidably supported thereon, and stop means for limiting the travel of said base die in each direction; a head, and means for urging said head toward said work table at will, and a head die mountable on said head; and an apportioning die movable to register with said base die when said base die is in one position in cooperation with certain of said stops, and including apportioning recesses to receive portions of material for deposit on said base die, and movable at will out of obstructive relation for movement of the base die to its other limit of travel for registry with said head die; said apportioning die comprising a flat plate having side walls for retention of material, and with said recesses comprising through passages and equally spaced; and said apportioning means having a handle at one end and being hinged to said machine at the other end for movement respectively into cooperation with the base die and out of obstructional relation, at will.

8. A patty forming and wrapping machine comprising; a frame; a bed immovably supported by said frame, and a work table supported thereby and extending forwardly and providing a sliding surface; guide means on said work table and a base die slidably supported thereon, and stop means for limiting the travel of said base die in each direction; a head, and means for urging said head toward said work table at will, and a head die mountable on said head; and an apportioning die movable to register with said base die when said base die is in one position in cooperation with certain of said stops, and including apportioning recesses to receive portions of material for deposit on said base die, and movable at will out of obstructive relation for movement of the base die to its other limit of travel for registry with said head die; said means for urging said head comprising a shaft; a handle for reciprocally operating said shaft; and toggle mechanism connecting said head to said shaft for operation of said head by depression of said handle to compress portions between said head die and base die; said apportioning die comprising a flat plate having side walls for retention of material, and with said recesses comprising through passages and equally spaced; and said apportioning means having a handle at one end and being hinged to said machine at the other end for movement respectively into cooperation with the base die and out of obstructional relation, at will.

9. A patty forming and wrapping machine comprising; a frame; a bed immovably supported by said frame, and a work table supported thereby and extending forwardly and providing a sliding surface; guide means on said work table and a base die slidably supported thereon, and stop means for limiting the travel of said base die in each direction; a head, and means for urging said head toward said work table at will, and a head die mountable on said head; and an apportioning die movable to register with said base die when said base die is in one position in cooperation with certain of said stops, and including apportioning recesses to receive portions of material for deposit on said base die, and movable at will out of obstructive relation for movement of the base die to its other limit of travel for registry with said head die; a pan frame supported beneath the work table and extending beyond each side thereof and having sliding support throughout its length and clearing the underside of said work table for sliding a pan from one end thereof to the other end at will, and a pan for each end of said frame.

10. A patty forming and wrapping machine comprising; a frame; a rocker shaft mounted in said frame and having a handle and a pair of spaced toggle levers mounted thereon; a head die; a head slidable in said frame and having link connections with said toggle levers and including means for securing said head die thereto; a base fixedly supported by said frame; a work table having a sliding top surface and supported by said base, and extending forwardly and having guiding means removably and reversibly supported thereon, said guiding means including stop means; a base die slidable between said guides and limited as to movement in both directions by said stop means, in one of which said base die is in registry with said head die; and an apportioning die hingedly supported at one end by said frame and located forwardly of said head and having a retaining wall each at the forward and back edges and having a plurality of equally spaced through passages for registry with recesses formed in the base die when the base die is at the other limit of its movement.

11. A structure as defined in claim 10; two pans, a pan frame forming a continuous slide support for said pans and mounted in spaced relation below said work table and extending beyond each side thereof to support a pan at each end for respectively holding material to be apportioned and to receive material in excess of that required for forming one set of portions, said pans being respectively slidable from one position to the other at will upon removal of the other pan.

12. A structure as defined in claim 10; said base and head dies and said apportioning die being removable and replaceable at will for forming patties of different volume and area; and said guiding means having differently spaced stop means on the respective sides and being reversible on said work table to accommodate dies for different sizes of patties and correctly limit movement of the base die for registry respectively with the head die and with the apportioning die.

13. A structure as defined in claim 10; a receptacle removably supported in receiving position with each of the respective ends of the apportioning die to hold material to be formed into patties and receive material in excess of that required to form a set of portions.

KEN E. BEMIS.

REFERENCES CITED

The following references are of record in the file of this patent:

UNITED STATES PATENTS

| Number | Name | Date |
|---|---|---|
| 717,707 | McIntosh | Jan. 6, 1903 |
| 781,498 | Darling | Jan. 31, 1905 |
| 860,000 | Wettlaufer | July 16, 1907 |
| 1,538,712 | McCormick | May 19, 1925 |
| 1,963,718 | Schatz | June 19, 1934 |
| 2,232,783 | Hausheer | Feb. 25, 1941 |
| 2,299,314 | Elesh et al. | Oct. 20, 1942 |
| 2,338,939 | Holly | Jan. 11, 1944 |

FOREIGN PATENTS

| Number | Country | Date |
|---|---|---|
| 531,188 | Germany | Aug. 6, 1931 |